(12) United States Patent
Riederer et al.

(10) Patent No.: US 9,288,112 B2
(45) Date of Patent: Mar. 15, 2016

(54) AUTOMATIC NETWORK DISCOVERY IN PRECISION TIME PROTOCOL NETWORKS

(71) Applicant: Rockwell Automation Technologies, Inc., Mayfield Heights, OH (US)

(72) Inventors: Kevin J. Riederer, Waukesha, WI (US); Gerry M. Nagel, Sussex, WI (US); Manas Sawant, Madison, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 231 days.

(21) Appl. No.: 14/085,916

(22) Filed: Nov. 21, 2013

(65) Prior Publication Data

US 2015/0139038 A1 May 21, 2015

(51) Int. Cl.
*H04L 12/24* (2006.01)
*H04L 12/26* (2006.01)

(52) U.S. Cl.
CPC .............. *H04L 41/12* (2013.01); *H04L 43/106* (2013.01)

(58) Field of Classification Search
CPC .................... H04L 43/18; H04L 41/12; H04L 45/02–45/028; H04L 67/1061; H04L 41/085–41/0853
USPC .......................................... 370/256, 255, 254
See application file for complete search history.

(56) References Cited

U.S. PATENT DOCUMENTS

| | | | | |
|---|---|---|---|---|
| 6,650,626 B1* | 11/2003 | Cain | ....................... | H04L 45/48 370/256 |
| 2006/0187916 A1* | 8/2006 | Vasseur | .................... | H04L 12/56 370/389 |
| 2008/0221721 A1* | 9/2008 | Reed | .................... | C23C 14/3414 700/109 |
| 2013/0028265 A1* | 1/2013 | Ronchetti | ............. | H04J 3/0697 370/400 |
| 2013/0158729 A1* | 6/2013 | Ghose | .................... | G05B 13/02 700/286 |
| 2013/0322294 A1* | 12/2013 | Jing | .................... | H04L 12/2807 370/254 |
| 2014/0092922 A1* | 4/2014 | Le Pallec | ................ | H04L 43/50 370/503 |
| 2015/0156072 A1* | 6/2015 | Kirrmann | ............. | H04L 41/046 370/254 |

* cited by examiner

*Primary Examiner* — Maharishi Khirodhar
*Assistant Examiner* — Kenneth P Hunt
(74) *Attorney, Agent, or Firm* — Boyle Fredrickson, S.C.

(57) ABSTRACT

Aspects of the present invention provide systems and methods using precise timing relationships between nodes in computer networks to generate mappings depicting the physical arrangement or ordering of nodes in the computer networks. The technical effect is by tracking the timing delays between nodes as observed by an individual node, and collecting such information together for subsequent processing, nodes may receive and/or construct an entire physical network topology using an algorithm accordingly.

20 Claims, 6 Drawing Sheets

120

|  | A RCV | B RCV | C RCV | D RCV | E RCV | F RCV |
|---|---|---|---|---|---|---|
| A SEND | 0 | 9 | 29 | 39 | 31 | 39 |
| B SEND | 8 | 0 | 21 | 30 | 19 | 31 |
| C SEND | 26 | 18 | 0 | 11 | 18 | 26 |
| D SEND | 35 | 30 | 8 | 0 | 32 | 10 |
| E SEND | 27 | 23 | 20 | 30 | 0 | 12 |
| F SEND | 41 | 29 | 31 | 11 | 13 | 0 |

TIMES (µS)

FIG. 4

AUTOMATIC NETWORK DISCOVERY IN PRECISION TIME PROTOCOL NETWORKS

BACKGROUND OF THE INVENTION

The present invention relates to the field of computer networks, and, in particular, to systems and methods for analyzing computer networks.

Computer networks, such as Institute of Electrical and Electronics Engineers (IEEE) 802.3 Ethernet networks and Ethernet/IP networks, are typically implemented via multiple connected nodes. Each node on the network often includes networking functionality at both a physical layer and a logical layer, and each node may be aware of and communicate with other nodes on the network. As a result, various nodes may be used to carry out particular functions in the computer network, whether alone or in combination with other nodes, such as nodes that are AC Servo Drives implementing I/O functionality as part of an industrial control system.

In such computer networks, multiple connected nodes may also be connected to other multiple connected nodes via switches, routers, gateways, hubs and/or other devices. Accordingly, such computer networks may be connected using one or more various networking topologies, such as a ring, daisy-chain, star and/or hybrid topology.

As the functions of a computer network change over time the nodes on the computer network often also change, requiring updates from their original configuration. For example, new nodes may be added to the network to increase its capability, while other nodes may be moved and/or removed from the network altogether. Despite such changes, protocols inherent in the computer network typically allow the nodes to continue to be logically aware of one another and communicate with one another. However, the physical arrangement or ordering of the nodes may not necessarily be known.

Understanding the physical arrangement or ordering of nodes is an important aspect in many computer networking applications. For example, in industrial control networks, it is desirable to have larger power consuming drives (nodes) closer to a DC power delivery converter (node) to minimize the transmission losses in the system. Also in many networks, it is important to know the physical arrangement or ordering of nodes to facilitate debugging of the network.

Sonic computer networks, such as Ethernet for Control Automation Technology (EtherCAT), may be inherently aware of the physical ordering of nodes in a network in addition to being logically aware. However, implementation of such networks typically requires implementation of specialized hardware in the nodes. Consequently, nodes not having such specialized hardware, such as legacy nodes, are typically not supported.

Other computer networks, such as those implemented using backplane systems, may also be inherently aware of the physical ordering of nodes in the network by virtue of their configuration and/or addressing protocols. However, such systems are typically limited by their configurations and therefore lack flexibility.

What is needed is a simplified computer networking solution that flexibly allows changes over time, and which may also be aware of the physical arrangement or ordering of nodes in addition to being logically aware.

SUMMARY OF THE INVENTION

The inventors have recognized that existing protocols enabling precise timing relationships between nodes in computer networks may be utilized to generate a mapping depicting the physical arrangement or ordering of nodes in a computer network. In Precision Time Protocol (PTP) networks, timing correction fields that are automatically updated in packets each time packets are received may be observed for determining relative transit times between nodes. The technical effect is by tracking the timing delays between nodes as observed by an individual node, and collecting such information together for subsequent processing, nodes may receive and/or construct an entire physical network topology using an algorithm accordingly.

In addition, and with respect to industrial control systems in particular, the inventors have recognized that network wiring typically follows power wiring, and that spatial distances may be approximated by network distances. Accordingly, the inventors have found that precise timing protocol aware nodes may be used to determine network distances, which, in turn, may be used to approximate spatial distances and ordering, which, in turn, may be used to limit power transmission losses by having greater power consuming nodes closer to a power delivery node with lesser power consuming nodes further from the power delivery node.

A method in accordance with an embodiment of the invention may use existing infrastructure to determine the physical topology of a network, such as an Ethernet or Ethernet/IP network. The method may utilize the time correction field of a Precision Time Protocol (PTP) packet, for example, a PTP "Sync" (Synchronization) packet, a "Follow_Up" packet, a "Delay_Req" (Delay Request) packet and/or a "Delay_Resp" (Delay Response) packet, such as in accordance with IEEE 1588-2008 and/or IEEE 1588-2002 ("Standard for a Precision Clock Synchronization Protocol for Networked Measurement and Control Systems"). Timing information provided by PTP packets may be aggregated to form a network view from each node's point of view, which may then be shared with all of the nodes (or drives). Each node may then combine each respective view to form a complete network graph based on the collected data.

In a preferred embodiment, a separate computer may initiate transmission of PTP packets from various nodes, aggregate timing data, form a network graph, disseminate results to the nodes and/or perform periodic updates.

Accordingly, embodiments of the invention may provide one or more of reduced debug times, visual network mappings, faster commissioning, easier enablement for future development and/or improved verification of bus configurations.

Specifically, the present invention provides a method for determining an arrangement of nodes configured in a computer network. The method comprises: (a) from at least two nodes, sending a broadcast packet to be received by other nodes configured in the computer network, wherein the broadcast packet includes a time correction field reflecting a time of departure of the broadcast packet from the sending node; (b) at each node receiving a broadcast packet, evaluating the time correction field of the broadcast packet for subsequently determining a relative transit time of the broadcast packet from a sending node to the receiving node, then updating the time correction field reflecting an updated time of departure of the broadcast packet before forwarding the broadcast packet to a next receiving node; and (c) determining an ordering arrangement of the nodes configured in the computer network based on the number of nodes and the relative transit times of the broadcast packets.

It is thus a feature of at least one embodiment of the invention to provide an automatic peer-to-peer connection establishment in self organizing networks, enabling automated or guided configuration (automatic IP address assignment). It is also a feature of at least one embodiment of the invention to improve the ability to detect user error in a network configuration. It is also a feature of at least one embodiment of the invention to simplify a virtual backplane implementation.

The method may further comprise determining an ordering arrangement of the nodes using a minimum spanning tree (MST) algorithm.

It is thus a feature of at least one embodiment of the invention to use a generally known algorithm to linearly characterize the physical ordering of the network.

The minimum spanning tree algorithm may be Kruskal's algorithm, Prim's algorithm or any other minimum spanning tree algorithm as known in the art.

It is thus a feature of at least one embodiment of the invention to use alternative, well known algorithms to linearly characterize the network.

The nodes may be configured in an industrial control network implementing Common Industrial Protocol (CIP) and/or related extensions, including CIP Sync.

It is thus a feature of at least one embodiment of the invention to ensure proper start up, power sequencing, configuration and/or operation of nodes in a precise timing environment typical of industrial control networks.

The relative transit times include times between nodes forwarding broadcast packets and nodes receiving the broadcast packets.

It is thus a feature of at least one embodiment of the invention to determine a timing relationship between a node receiving a broadcast packet and an original sending node, and/or between a node receiving a broadcast packet and a subsequently forwarding node.

The nodes implement a Precision Time Protocol (PTP) in accordance with IEEE 1588.

It is thus a feature of at least one embodiment of the invention to use an existing precise timing infrastructure with a known protocol for determining relative transit times.

The broadcast packet may be a Delay Request packet or a Synchronization packet.

It is thus a feature of at least one embodiment of the invention to utilize varying communication types to determine such timing relationships.

The method may further comprise graphically displaying the ordering arrangement of the nodes as a visual network map.

It is thus a feature of at least one embodiment of the invention to provide a visual network map to simplify diagnostics and technical support and create visualization during maintenance, debugging and replacement.

The present invention may also provide a program stored in a non-transitory computer-readable storage medium executable on an electronic computer operable to (a) send from at least two nodes configured in a computer network broadcast packets receivable by other nodes in the network, wherein each broadcast packet includes a time correction field reflecting a time of departure of the broadcast packet; (b) at each node receiving a broadcast packet, evaluate the time correction field of the broadcast packet, then update the time correction field reflecting an updated time of departure of the broadcast packet at the receiving node before forwarding the broadcast packet to a next receiving node; (c) evaluate relative transit times of the broadcast packet from each sending node to each receiving node using the time correction field; and (d) determine an ordering arrangement of the nodes in the network based on the total number of nodes and the relative transit times.

These particular features and advantages may apply to only some embodiments falling within the claims and thus do not define the scope of the invention.

BRIEF DESCRIPTION OF THE DRAWINGS

FIG. 4 is a data table constructed using relative transit times between nodes in the computer network of FIG. 1 in accordance with an embodiment of the invention;

Figure 1:
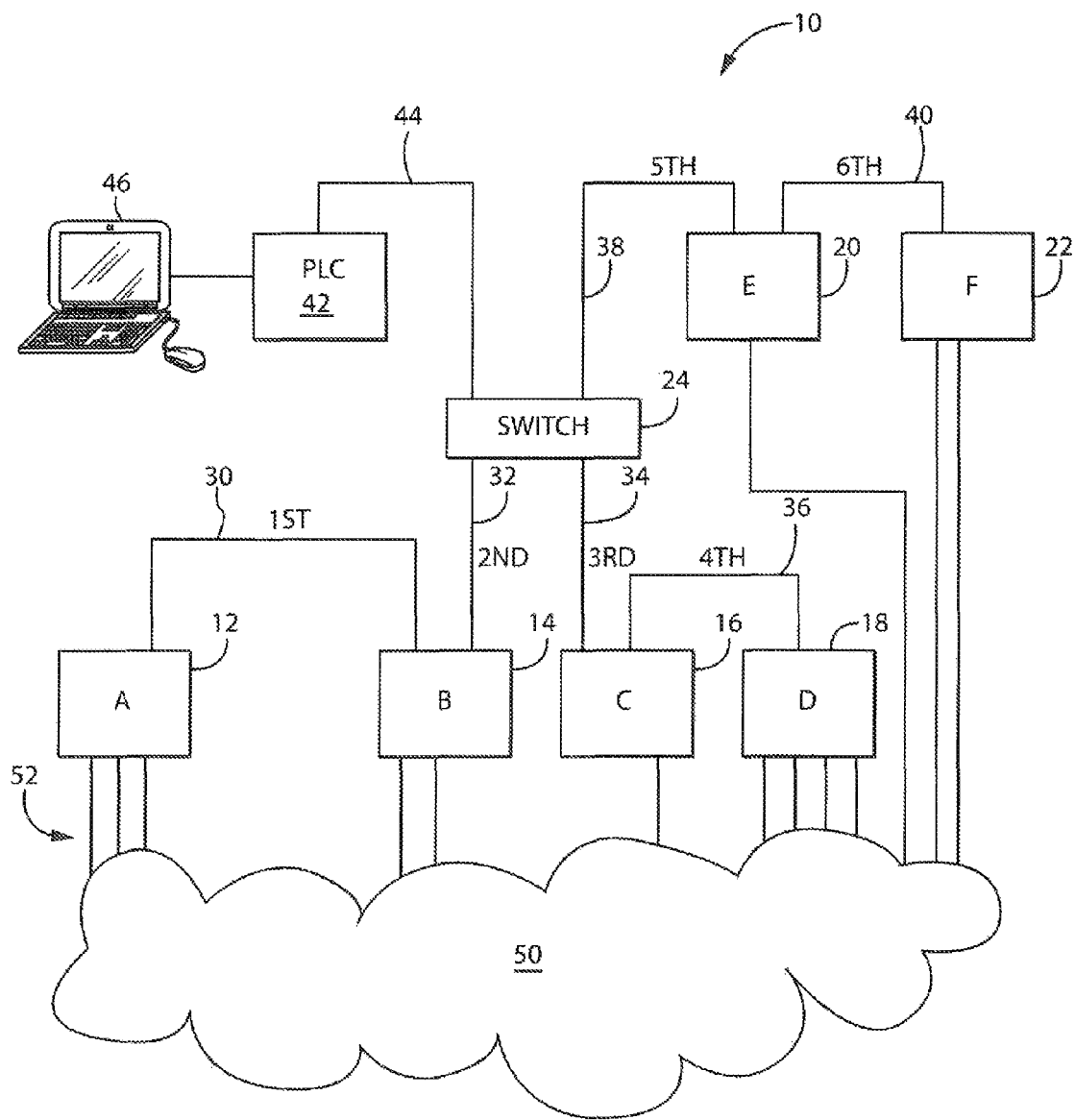
FIG. 1 is an exemplar system diagram comprising an arrangement of nodes configured in a computer network in accordance with an embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose.

DETAILED DESCRIPTION OF THE PREFERRED EMBODIMENT

Referring now to FIG. 1, an exemplar system diagram comprising an arrangement of nodes configured in a computer network in accordance with an embodiment of the invention is provided. An industrial control system 10 includes a computer network having an arrangement of nodes 12, 14, 16, 18, 20 and 22, labeled A, B, C, D, E and F, respectively. Each node A, B, C, D, E and F includes networking functionality at both a physical layer and a logical layer, and each node may communicate with other nodes on the network accordingly. Node A may be, for example, a converter that receives AC power and provides DC power to other nodes in the network, and nodes B, C, D, E and F may be, for example, drives requiring varying amounts of DC power delivery from node A.

By way of example, a first port of Node A is connected to a first port of node B via a first network segment 30, and a second port of node B is connected to a first port of a multi-port network switch 24 via a second network segment 32. In turn, a second port of the network switch 24 is connected to a first port of node C via a third network segment 34, and a second port of node C is connected to a first port of node D via a fourth network segment 36. In addition, a third port of the network switch 24 is connected to a first port of node E via a fifth network segment 38, and a second port of node F is connected to a first port of node F via a sixth network segment 40. In addition, a fourth port of the network switch 24 is connected to a programmable logic controller (PLC) 42 via a controller link 44, which may or may not be considered to be part of the network as desired.

The network segments 30, 32, 34, 36, 38 and 40 collectively form the computer network, which may be for example an Ethernet network or Ethernet/IP network implementing CIP. In addition, the nodes A, B, C, D, E and F implement Precision Time Protocol (PTP) in accordance with IEEE 1588. However, in other embodiments, other networking and/or time-based protocols may similarly be used.

The PLC 42 is further connected to an electronic computer 46 which may or may not be part of the computer network comprising the nodes A. B, C, D, E and F. The electronic computer 46 includes a processor, memory, storage, keyboard, display and/or general I/O. The computer 46 may be, for example, a personal computer, laptop or tablet, and executes programs stored in a non-transitory computer-readable storage medium.

In implementing the industrial control system 10, the nodes A, B, C, D, E and/or F, in turn, may sense and/or control one or more varying aspects of an industrial control process 50 via industrial control 10 links 52.

In alternative embodiments, varying topologies may be implemented, such as ring, daisy-chain, star and/or hybrid topologies, including with greater or fewer nodes and/or switches. In addition, the network switch 24, and/or other switches if present, may serve in addition to switching as a router, gateway, hub and/or other device.

Figure 2:
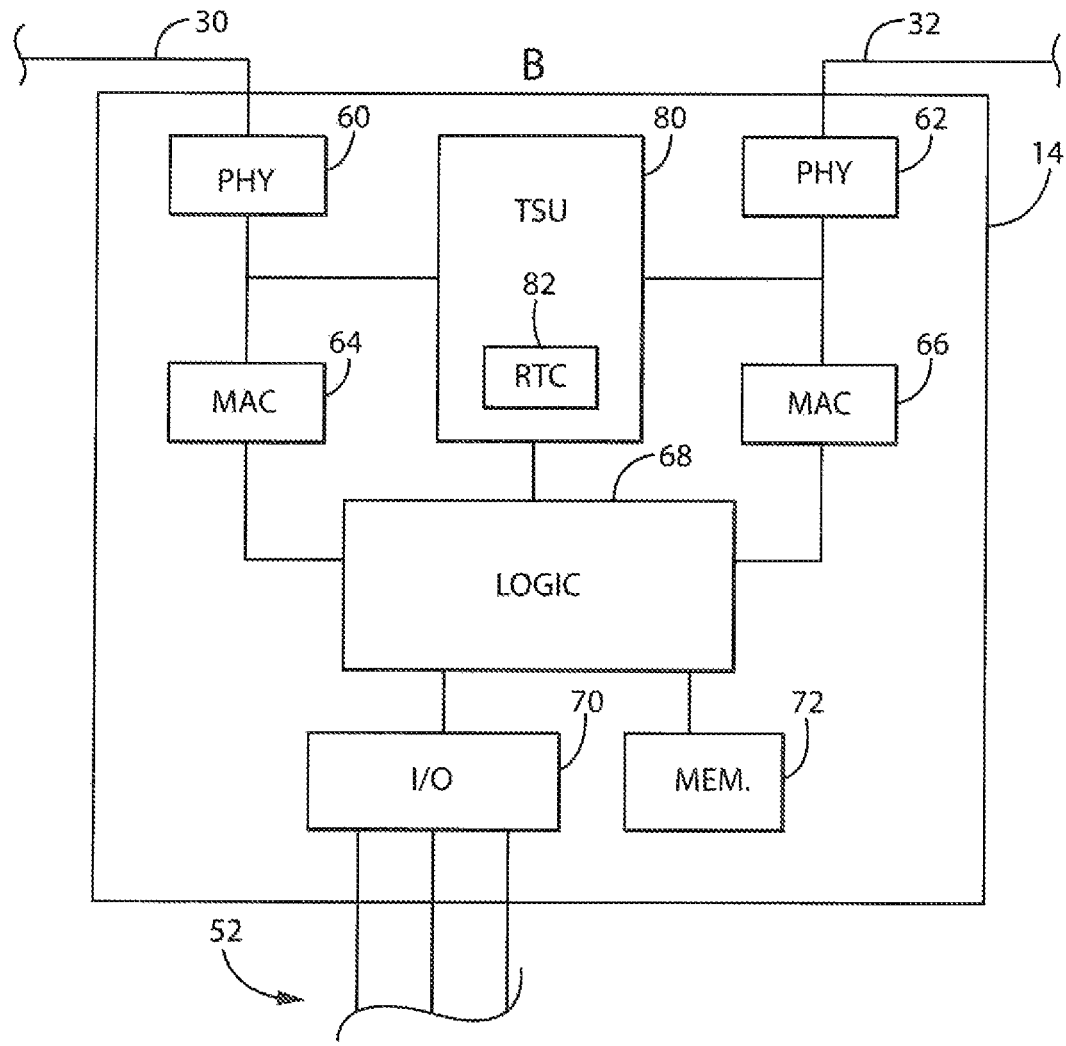
FIG. 2 is an exemplar node from the computer network of FIG. 1.

Referring now to FIG. 2, exemplar node B from the computer network of FIG. 1 is provided. Exemplar node B may be representative of any of nodes A, B, C, D, F and F. Node B includes PHY interfaces 60 and 62 for connecting to the first and second network segments 30 and 32, respectively. The PHY interfaces 60 and 62, in turn, connect to MAC interfaces 64 and 66, respectively. The MAC interfaces 64 and 66, in turn, connect to logic 68, which may comprise a microprocessor, microcontroller, or other programmable logic, and, in turn, the logic 68 connects to the industrial control I/O links 52 via I/O control 70. The logic 68 also connects to a memory/storage 72.

In implementing PTP, exemplar node B also includes a timestamp unit (TSU) 80, which further comprises a high precision real-time clock (RTC) 82. The TSU 80 is connected to the PHY interfaces 60 and 62, the MAC interfaces 64 and 66 and the logic 68. In accordance with PTP, node B may be configured as a master clock or a slave clock. As a master clock, node B may periodically send a Synchronization packet including the time from the RTC 82 read by the logic 68. After the synchronization packet is sent, node B may then send a Follow Up packet with a time from the RTC 82 read by the TSU 80 and insert it into the packet between the MAC and the PHY, at a level closest to the interface. Conversely, as a slave clock, node B may periodically receive a Synchronization packet and a Follow Up packet, and may update its RTC 82 accordingly.

In addition, in implementing PTP, as a master clock, node B may receive a Delay Request packet and respond by sending a Delay Response packet, or as a slave clock, node B may send a Delay Request packet and receive a Delay Response packet. Such protocols are typically used for updating a slave clocks RTC 82 to compensate for delay time on the network.

In an embodiment, each node may act as a slave clock with the PLC 42 serving as a master clock. However, the computer 46 may nevertheless emulate master clock behavior from slave clock nodes, such as causing a slave clock node to send a Synchronization packet, for determining and ordering arrangement of the nodes.

Figure 3:
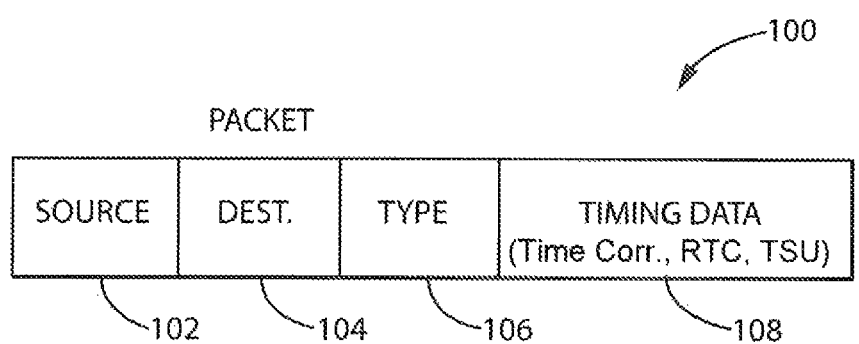
FIG. 3 is an exemplar broadcast packet for communicating timing information in accordance with an embodiment of the invention.

Referring now to FIG. 3, an exemplar broadcast packet 100 for communicating timing information in accordance with an embodiment of the invention is provided. The broadcast packet 100 comprises multiple fields, including: a source field 102 for identifying the original node sending the broadcast packet 100; a destination field 104 for identifying the nodes to receive the broadcast packet 100; a type field 106 for identifying the type of packet, which may typically be a broadcast packet for forwarding and reception by every node in the network; and a timing data 108 for transmitting timing information consistent with the packet type. The timing data 108 may include, for example, a timing correction field of the broadcast packet 100, a time read from the RTC 82 by the logic 68, and/or a time inserted by the TSU 80 between the MAC and the PHY. With a transparent clock enabled, the timing correction field of the timing data 108 automatically updates as it transmits from one node to the next. Accordingly, the timing correction field of the timing data 108 represents a continuously updated timing correction, such as an update indicating the amount of time spent inside of devices having transparent clocks. Thus, every node can determine relative distances.

Referring again to FIG. 1, in operation, from at least two nodes, such as nodes A and B, a broadcast packet 100 is sent for reception by other nodes configured in the computer network. Each broadcast packet 100 may be sent, for example, as a PTP Request packet. Accordingly, each broadcast packet 100 reflects a time of departure of the packet from the sending node. In turn, each broadcast packet 100 is received by one or more adjacent nodes. The adjacent nodes, in turn, determine a time of arrival for each broadcast packet 100, such as by observing the timing correction field in the timing data 108, or by observing the difference between the time from the RTC 82 and/or the TSU 80 inserted by the sending node and the time of its own RTC 82 and/or TSU 80, for subsequently determining relative transit times from the sending node. Then, the adjacent nodes forward each broadcast packet 100 to the next adjacent nodes consistent with the broadcast message type. Prior to forwarding, the adjacent nodes automatically update the timing correction field in the timing data 108 in the broadcast packet 100. Consequently, timing relationships between nodes receiving a broadcast packet 100 and an original sending node and/or a subsequently forwarding node may be observed.

For example, node B may send a broadcast packet 100 for reception by nodes A, C, D, E and F configured in the computer network. Accordingly, the broadcast packet 100 reflects a time of departure of the packet from node B. In turn, the broadcast packet 100 is received by adjacent nodes A, C and E. In other words, the broadcast packet 100 first transmits in two directions, one way to node A and another way to the switch 24, then from the switch 24, the broadcast packet again transmits in two directions, one way to node C and another way to node E. The adjacent nodes A, C and E, in turn, automatically update and observe the timing correction field in the timing data 108 and determine a time of arrival for the broadcast packet 100 for subsequently determining a relative transit time from node B. Then, the adjacent nodes C and E forward the broadcast packet 100 to the next adjacent nodes D and F consistent with the broadcast message type (node A does not have a next adjacent node). Next, nodes D and F automatically update and observe the timing correction field in the timing data 108 and determine a time of arrival for the broadcast packet 100 for subsequently determining relative transit times from nodes C and E, respectively.

Referring now to FIG. 4, a data table 120 may be constructed, locally by the nodes sharing information, globally by the computer 46, or otherwise, using collected relative transit times between nodes as described above with respect to FIG. 1 (i.e., a network distance graph). Each row of the table 120 corresponds to a packet sent by a respective node. For example, the first row, labeled $A_{SEND}$, corresponds to a packet sent by node A. Similarly, each column of the table 120 corresponds to packets received by a respective node. For example, the first column, labeled $A_{RCV}$, corresponds to packets received by Node A. Value entries in the table 120 represent the time correction field of each packet in microseconds (µs).

For example, the first row and first column entry in which node A sends a packet, node A sees as the packet as corresponding to a time entry of zero. However, the first row and second column entry, in which node B sees the packet, has a time entry of 9 µs. In other words, node A sent the packet with a time of departure of 0 µs, and node B automatically updated and observed the timing correction field in the timing data of the packet as 9 µs later. Note, however, the second row and first column entry, in which node B sends a packet and node A receives the packet, has a time entry of 8 µs. This disparity of 1 µs between node A sending a packet to node B and node B sending a packet to node A may be attributable to clock noise, clock skew, clock jitter and/or other processing delays inherent in the system. However, such minor disparities may be considered and compensated in subsequent processing.

Likewise, the first row and third column entry in which node A sends the packet and node C receives the packet has a time entry of 29 µs. In other words, node A sent a packet with a time of departure of 0 µs, and node C automatically updated and observed the timing correction field in the timing data of the packet as 29 µs later. Once again, note, however, the third row and first column entry, in which node C sends a packet and node A receives the packet, has a time entry of 26 µs. This disparity of 3 µs between node A sending a packet to node C and node C sending a packet to node A may again be attributable to clock noise, clock skew, clock jitter and/or other processing delays inherent in the system, which may be considered and compensated in subsequent processing.

Consequently, with the relative transit times of the broadcast packets collected, and the number of nodes configured in the computer network known, an ordering arrangement of the nodes may be determined. In alternative embodiments, fewer entries than the entire data table 120 may be collected before proceeding to solve the ordering arrangement of the nodes. In addition, in other embodiments, relative transit times of the broadcast packets may be determined via relative transit times from the original sending node, using the RTC and/or TSU of nodes, as opposed to the observed updated timing correction fields.

Figure 5:
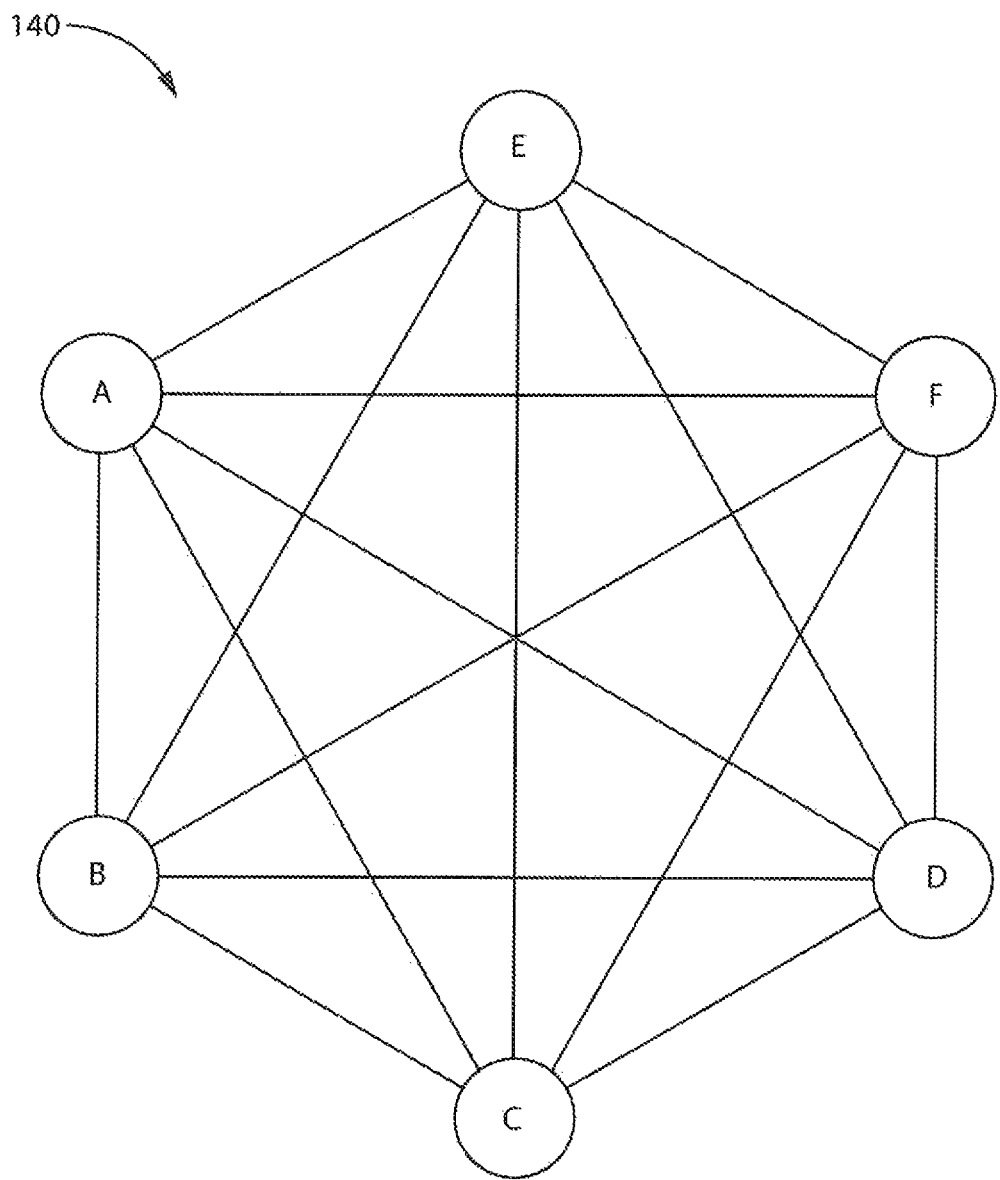
FIG. 5 is a logical representation of the nodes in the computer network of FIG. 1.

Referring now to FIG. 5, a logical representation 140 of the nodes in the computer network of FIG. 1 is shown in which each node is logically aware of each other node in the system. For example, node A is logically coupled to nodes B, C, D, E and F; node B is logically coupled to nodes A, C, D, E and F; node C is logically coupled to nodes A, B, D, E and F; and so forth. However, the physical ordering arrangement of the nodes is not necessarily known.

However, now using an algorithm, such as a minimum spanning tree algorithm as understood in the art, the physical ordering arrangement of the nodes configured in the computer network may be determined based on the number of nodes vertices) and the relative transit times (i.e., weights) between the nodes (i.e., edges). A spanning tree is a tree that connects all vertices together, and a minimum spanning tree is a spanning tree with weight less than or equal to the weight of every other spanning tree (i.e., minimum cost). With the precise timing relationships inherent in PTP, measured on the order of microseconds, the likelihood of multiple minimum spanning trees having the same weights is probabilistically low. In other words, the timing relationships provide a sufficiently high probability of uniqueness.

Examples of minimum spanning tree algorithms as known in the art include, for example, Kruskal's algorithm and Prim's algorithm. These are also examples of greedy algorithms that run in polynomial time.

Carrying out the steps of Kruskal's algorithm may include, for example:
  a. Creating a forest or set of trees where each vertex in the graph is a separate tree;
  b. Creating a set containing all the edges in the graph;
  c. While the set containing all the edges is not empty, and the forest or set of trees is not yet spanning, then repeat the following steps:
    i. Remove an edge with minimum weight from the set containing all the edges;
    ii. If that edge connects two different trees, then add it to the forest, combining two trees into a single tree;
    iii. Otherwise, discard the edge.

Carrying out the steps of Prim's algorithm may include, for example:
  a. Creating a tree containing a single vertex, chosen arbitrarily from the graph;
  b. Creating a set containing all the edges in the graph;
  c. Looping until every edge in the set connects two vertices in the tree;
  d. Removing from the set an edge with minimum weight that connects a vertex in the tree with a vertex not in the tree; and
  e. Adding that edge to the tree.

Figure 6:
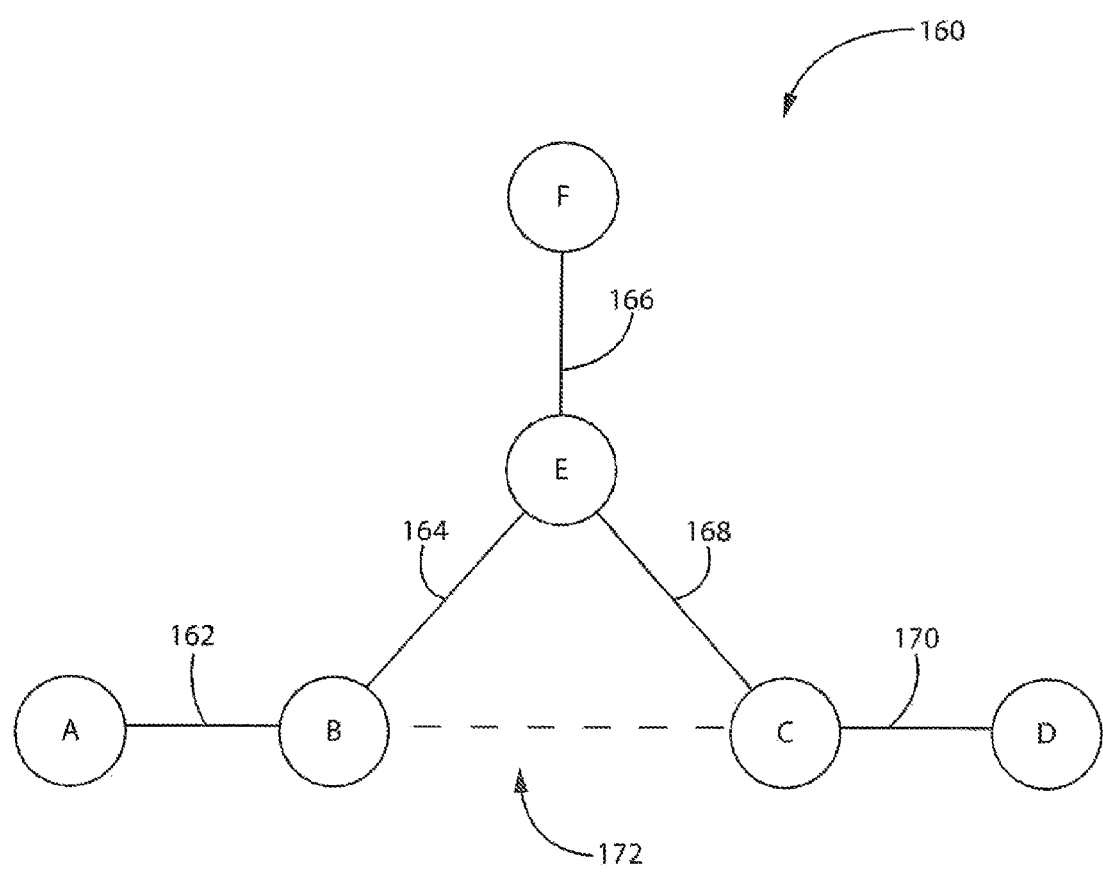
FIG. 6 is a linearly characterized, physical representation of the nodes in the computer network of FIG. 1.

Referring now to FIG. 6, as a result of applying such algorithm to the collection of data described above with respect to FIG. 4, a linearly characterized, physical representation of the ordered nodes in the computer network may be provided. Indeed, such ordering arrangement of the nodes may be graphically displayed as a visual network map 160, such as to the display of the computer 46.

As depicted in the visual network map 160; node A is only physically coupled to node B via link 162; node B is only physically coupled to node E via link 164; node E is only physically coupled to node F in one direction via link 166 and to node C in another direction via link 168; and node C is only physically coupled to node D via link 170. Further yet, the close timing relationships between nodes B, C and E as observed in the varying directions may be used to further infer the presence of a switch between nodes B, C and E, and thus an added coupling between nodes B and C via link 172. Such timing relationships may be set according to a threshold, such as a grouping of three or more nodes with each relative transit time ≤3 µs.

Figure 7:
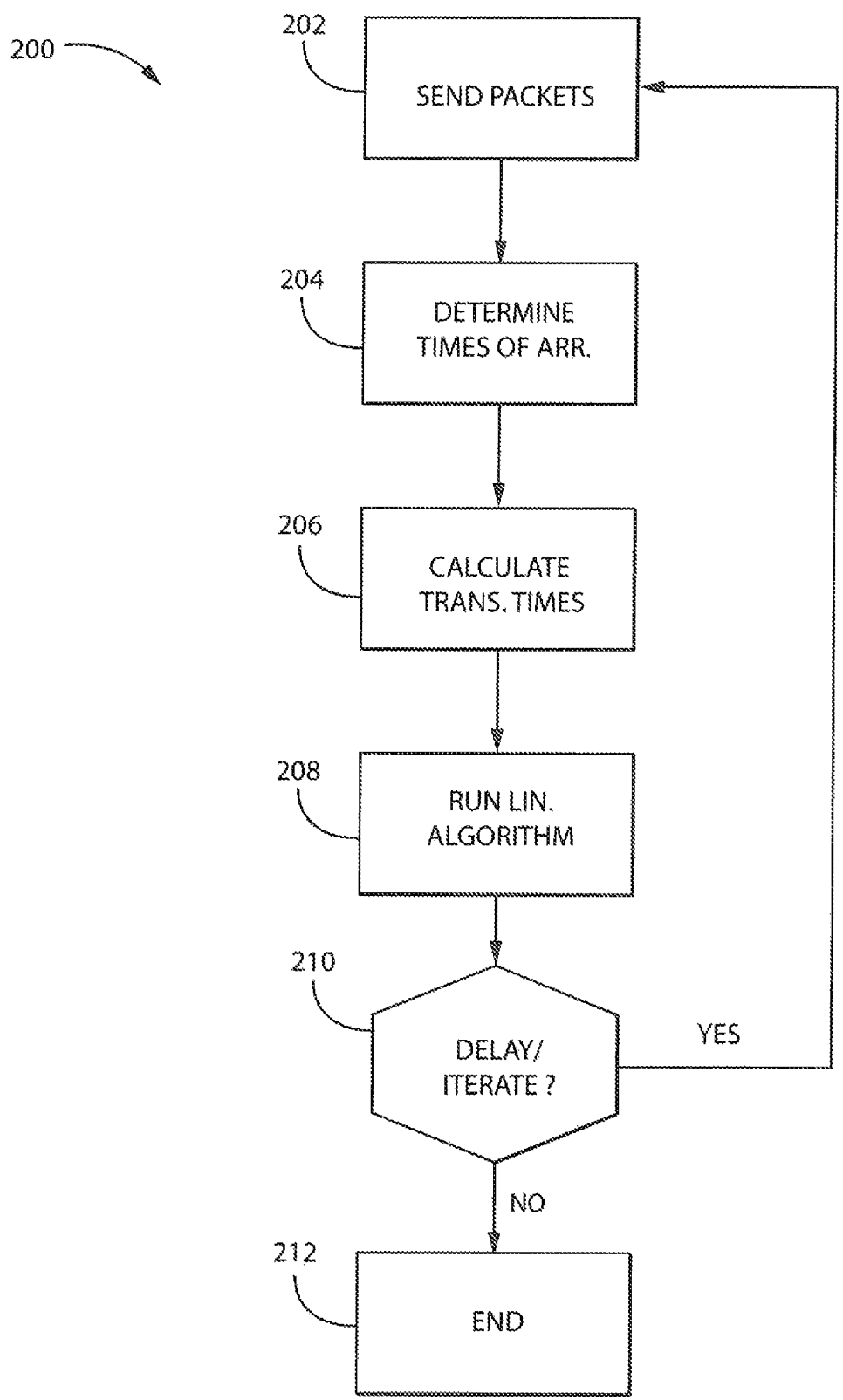
FIG. 7 is a flowchart illustrating a process for ordering arrangement of nodes in a computer network in accordance with an embodiment of the invention.

Referring now to FIG. 7, a flowchart 200 illustrates one exemplary process in accordance with an embodiment of the invention. At process block 202, broadcast packets are sent from at least two nodes configured among a plurality of nodes in a computer network. The packets are receivable by the other nodes in the network and reflect times of departure from the respective sending notes.

Next, at process block 204, each node receiving a broadcast packet determines a time of arrival for the respective broadcast packet. Then, in process block 206, relative transit times between nodes are calculated and/or evaluated, such as by observing the timing correction field in the timing data of the packet, or by observing the difference between the time from the RTC and/or the TSU data inserted by the sending node and the time of the RTC and/or the TSU observed at the receiving node.

Next, in process block 208, and ordering arrangement of the nodes in the network is determined upon running a linearly characterizing algorithm, such as a minimum cost, minimum spanning tree algorithm, which may then be graphically displayed. Then, in decision block 210, perhaps after an amount of delay, the process may then elect to repeat again, or simply end at process block 212. If the process elects to repeat again, the process returns again to process block 202.

Alternative embodiments may implement various features described above in hardware and/or software and with varying levels of integration. In addition, alternative embodiments may combine or further separate or distribute hardware elements, or software elements, as may be appropriate for the task. For example, a combined PLC, electronic, computer and node, or other such combination of elements, may be used as understood in the art. Such alternative embodiments are within the scope of the invention.

Certain terminology is used herein for purposes of reference only, and thus is not intended to be limiting. For example, terms such as "first," "second" and other such numerical terms referring to structures do not imply a sequence or order unless clearly indicated by the context. Such terminology may include the words specifically mentioned above, derivatives thereof, and words of similar import.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a "processor," "microprocessor" or "microcontroller" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims.

All of the publications described herein, including patents and non-patent publications, are hereby incorporated herein by reference in their entireties.

What is claimed is:

1. A method for determining an arrangement of nodes configured in a computer network, the method comprising:
    (a) from at least two nodes, sending a broadcast packet to be received by other nodes configured in the computer network, wherein the broadcast packet includes a time correction field reflecting a time of departure of the broadcast packet from the sending node;
    (b) at each node receiving a broadcast packet, evaluating the time correction field of the broadcast packet for subsequently determining a relative transit time of the broadcast packet from a sending node to the receiving node, then updating the time correction field reflecting an updated time of departure of the broadcast packet before forwarding the broadcast packet to a next receiving node;
    (c) determining an ordering arrangement of the nodes configured in the computer network based on the number of nodes and the relative transit times of the broadcast packets; and
    (d) placing a greater power consuming node closer to a power delivery node and a lesser power consuming node further from the power delivery node in accordance with the ordering arrangement.

2. The method of claim 1, further comprising determining an ordering arrangement of the nodes using a minimum spanning tree algorithm.

3. The method of claim 2, wherein the minimum spanning tree algorithm is Kruskal's algorithm.

4. The method of claim 2, wherein the minimum spanning tree algorithm is Prim's algorithm.

5. The method of claim 1, wherein the nodes are configured in an industrial control network implementing Common Industrial Protocol (CIP).

6. The method of claim 1, wherein the nodes implement Precision Time Protocol (PTP) in accordance with IEEE 1588.

7. The method of claim 6, wherein the broadcast packet comprises a Delay Request packet.

8. The method of claim 6, wherein the broadcast packet comprises a Synchronization packet.

9. The method of claim 1, further comprising graphically displaying the ordering arrangement of the nodes as a visual network map.

10. A network discovery program stored in a non-transitory computer-readable storage medium executable on an electronic computer operable to:
    (a) send from at least two nodes configured in a computer network broadcast packets receivable by other nodes in the network, wherein each broadcast packet includes a time correction field reflecting a time of departure of the broadcast packet;
    (b) at each node receiving a broadcast packet, evaluate the time correction field of the broadcast packet, then update the time correction field reflecting an updated time of departure of the broadcast packet at the receiving node before forwarding the broadcast packet to a next receiving node;
    (c) evaluate relative transit times of the broadcast packet from each sending node to each receiving node using the time correction field;
    (d) determine an ordering arrangement of the nodes in the network based on the total number of nodes and the relative transit times; and
    (e) determine placement a greater power consuming node closer to a power delivery node with a lesser power consuming node further from the power delivery node in accordance with the ordering arrangement.

11. The program of claim 10, further comprising using a minimum spanning tree algorithm to determine the ordering arrangement of the nodes.

12. The program of claim 11, wherein the minimum spanning tree algorithm is Kruskal's algorithm.

13. The program of claim 11, wherein the minimum spanning tree algorithm is Prim's algorithm.

14. The program of claim 10, wherein the nodes are configured in an industrial control network implementing Common Industrial Protocol (CIP).

15. The program of claim 10, wherein the nodes implement Precision Time Protocol (PTP) in accordance with IEEE 1588.

16. The program of claim 15, wherein the broadcast packet comprises a Delay Request packet.

17. The program of claim 15, wherein the broadcast packet comprises a Synchronization packet.

18. The program of claim 10, wherein the program is further operable to graphically display the ordering arrangement of the nodes as a visual network map.

19. The method of claim 1, further comprising determining a coupling between nodes according to a grouping of three or more nodes having relative transit times less than a threshold.

20. The program of claim 10, wherein the program is further operable to determine a coupling between nodes according to a grouping of three or more nodes having relative transit times less than a threshold.

* * * * *